United States Patent
Ehmann et al.

(10) Patent No.: US 10,129,314 B2
(45) Date of Patent: Nov. 13, 2018

(54) MEDIA FEATURE DETERMINATION FOR INTERNET-BASED MEDIA STREAMING

(71) Applicant: Pandora Media, Inc., Oakland, CA (US)

(72) Inventors: Andreas F Ehmann, San Francisco, CA (US); Erik Michael Schmidt, Piedmont, CA (US); Stephen Hogan, San Leandro, CA (US)

(73) Assignee: Pandora Media, Inc., Oakland, CA (US)

( * ) Notice: Subject to any disclaimer, the term of this patent is extended or adjusted under 35 U.S.C. 154(b) by 349 days.

(21) Appl. No.: 14/829,220

(22) Filed: Aug. 18, 2015

(65) Prior Publication Data

US 2017/0054779 A1 Feb. 23, 2017

(51) Int. Cl.
*H04L 29/06* (2006.01)
*G06F 17/30* (2006.01)
*G06F 3/16* (2006.01)
*H04L 29/08* (2006.01)

(52) U.S. Cl.
CPC .......... *H04L 65/602* (2013.01); *G06F 3/165* (2013.01); *G06F 17/30023* (2013.01); *H04L 67/2819* (2013.01)

(58) Field of Classification Search
CPC ... H04L 65/602; G06F 3/165; G06F 17/30023
See application file for complete search history.

(56) References Cited

U.S. PATENT DOCUMENTS

| | | | | |
|---|---|---|---|---|
| 7,626,111 B2* | 12/2009 | Kim | ......................... | G10H 1/00 700/94 |
| 7,912,565 B2* | 3/2011 | Tazime | ................ | G11B 27/105 700/94 |
| 8,892,497 B2 | 11/2014 | Konuma et al. | | |
| 2001/0025259 A1* | 9/2001 | Rouchon | ............ | G06Q 10/0637 705/7.36 |
| 2002/0088336 A1* | 7/2002 | Stahl | .................... | G10H 1/0041 84/609 |
| 2003/0040904 A1* | 2/2003 | Whitman | ................ | G10L 17/02 704/212 |

(Continued)

OTHER PUBLICATIONS

PCT International Search Report and Written Opinion for PCT/US2016/040055, dated Sep. 12, 2016, 8Pages.

*Primary Examiner* — Michael A Keller
*Assistant Examiner* — Javier O Guzman
(74) *Attorney, Agent, or Firm* — Fenwick & West LLP (57) ABSTRACT

A media service server for streaming media items with similar media features receives a plurality of media items, where each media item of the plurality of media item is labeled with one or more media features characterizing the media item. Audio content features from the plurality of media items are extracted. Correlations between the audio content features and the media features are identified. A set of media items to be analyzed is received. For each media item of the set of media items, a set of media features based on the identified correlations between the audio content features and the plurality of media features is estimated. Each estimated media feature is associated with a confidence score. The set of media items with the estimated media features is provided to one or more experts for expert analysis.

20 Claims, 5 Drawing Sheets

(56) References Cited

U.S. PATENT DOCUMENTS

| | | | |
|---|---|---|---|
| 2005/0215239 A1* | 9/2005 | Kopra | G06Q 30/06 455/414.1 |
| 2006/0065102 A1* | 3/2006 | Xu | G06F 17/30743 84/600 |
| 2007/0208771 A1* | 9/2007 | Platt | G06F 17/30038 |
| 2007/0223871 A1 | 9/2007 | Thelen | |
| 2008/0133441 A1* | 6/2008 | West | G06N 99/005 706/46 |
| 2008/0195654 A1* | 8/2008 | Weare | G06F 17/30598 |
| 2008/0229910 A1* | 9/2008 | Kobayashi | G06F 17/30749 84/601 |
| 2009/0240688 A1* | 9/2009 | Ohwa | G11B 27/105 |
| 2010/0094762 A1* | 4/2010 | Ruhe | G06Q 30/00 705/306 |
| 2010/0131844 A1* | 5/2010 | Wohlert | G06F 17/30029 715/716 |
| 2010/0191733 A1* | 7/2010 | Park | G06F 17/30029 707/737 |
| 2010/0282045 A1* | 11/2010 | Chen | G06F 17/30743 84/612 |
| 2012/0331496 A1* | 12/2012 | Copertino | H04N 21/25866 725/14 |
| 2014/0278845 A1 | 9/2014 | Teiser et al. | |
| 2015/0242447 A1* | 8/2015 | Ipeirotis | G06F 17/30303 705/14.45 |
| 2015/0243279 A1* | 8/2015 | Morse | G10L 15/183 704/2 |
| 2015/0347388 A1* | 12/2015 | Lu | G06F 9/454 704/9 |
| 2016/0140225 A1* | 5/2016 | Jung | G06F 3/165 707/722 |

* cited by examiner

MEDIA FEATURE DETERMINATION FOR INTERNET-BASED MEDIA STREAMING

BACKGROUND

Field of Disclosure

The present invention generally relates to delivering audio content within an Internet-based media streaming system, and more specifically, to identifying media features (e.g., musicological features) characterizing media content in order to enhance relevance of media content provided to users.

Description of the Related Art

Streaming audio content has become ubiquitous. One way of delivering audio content is to automatically provide musically-similar audio content that suits the listeners' preferences and interests, rather than requiring the listeners to manually request specific audio content.

Audio content can be described as collections of "musicological features"—values representing audio characteristics of the audio content, such as tone, instrument, genre, etc. Being able to represent audio content according to musicological features allows a system to better identify the types of audio content that a given listener is likely to appreciate. For example, musically-similar audio content that shares similar musicological features with audio content already known to be appreciated by a listener can be discovered and provided to the listener. However, determining the musicological features of given audio content is a large undertaking. Conventionally, human analysts determine musicological features of audio content. This process is laborious and prone to errors and variation. For example, in some systems, it may take approximately 15 minutes for a trained person to identify the musicological features of a song. When aggregated over all the items of audio content for which musicological features are desired, this amounts to an enormous amount of time. Further, inconsistent and inaccurate identifications of musicological features can reduce the effectiveness of audio content.

SUMMARY

The above and other needs are met by a computer-implemented method, a non-transitory computer-readable storage medium storing executable code, and a device for selecting media items based on inferred user preferences.

One embodiment of the computer-implemented method for identifying media features for streaming media items with similar media features comprises receiving, at a media service server, a plurality of media items, where each media item of the plurality of media item is labeled with one or more media features characterizing the media item. Audio content features from the plurality of media items are extracted. Correlations between the audio content features and the media features are identified. A set of media items to be analyzed is received. For each media item of the set of media items, a set of media features based on the identified correlations between the audio content features and the plurality of media features is estimated. Each estimated media feature is associated with a confidence score. The set of media items with the estimated media features is provided to one or more experts for expert analysis.

One embodiment of a non-transitory computer-readable storage medium storing executable computer program instructions for identifying media features for streaming media items with similar media features, comprises instructions for receiving a plurality of media items, where each media item of the plurality of media item is labeled with one or more media features characterizing the media item. Audio content features from the plurality of media items are extracted. Correlations between the audio content features and the media features are identified. A set of media items to be analyzed is received. For each media item of the set of media items, a set of media features based on the identified correlations between the audio content features and the plurality of media features is estimated. Each estimated media feature is associated with a confidence score. The set of media items with the estimated media features is provided to one or more experts for expert analysis.

One embodiment of a non-transitory computer-readable storage medium storing executable computer program instructions for identifying media features for streaming media items with similar media features, comprises instructions for receiving a plurality of media items, where each media item of the plurality of media item is labeled with one or more media features characterizing the media item. Audio content features from the plurality of media items are extracted. Correlations between the audio content features and the media features are identified. A set of media items to be analyzed is received. For each media item of the set of media items, a set of media features based on the identified correlations between the audio content features and the plurality of media features is estimated. Each estimated media feature is associated with a confidence score. The set of media items with the estimated media features is provided to one or more experts for expert analysis.

One embodiment of a system for identifying media features for streaming media items with similar media features, comprises a processor for executing computer program instructions and a non-transitory computer-readable storage medium comprising computer program instructions executable by the processor. The computer program instructions comprise instructions for receiving a plurality of media items, where each media item of the plurality of media item is labeled with one or more media features characterizing the media item. Audio content features from the plurality of media items are extracted. Correlations between the audio content features and the media features are identified. A set of media items to be analyzed is received. For each media item of the set of media items, a set of media features based on the identified correlations between the audio content features and the plurality of media features is estimated. Each estimated media feature is associated with a confidence score. The set of media items with the estimated media features is provided to one or more experts for expert analysis.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
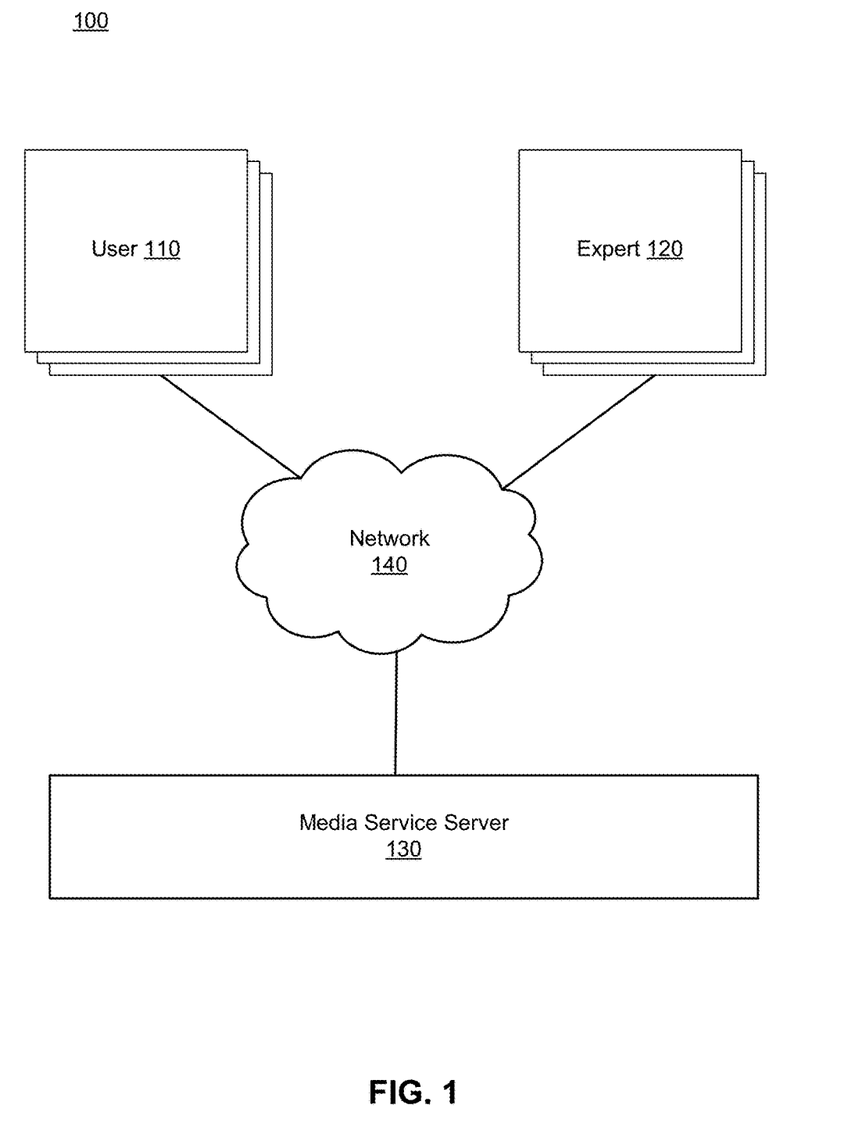
FIG. 1 is a high-level block diagram illustrating an embodiment of an environment for generating playlists based on inferred user preferences.

FIG. 1 illustrates a computing environment 100 for determining features for media items, according to an embodiment. The environment includes entities such as users 110, experts 120, a media service server 130, and a network 140. The network 140 connects the users 110, experts 120, and media service server 130. In the illustrated example, only one media service server 130 is shown, but there may be multiple instances of the media service server.

The users 110 receive media content delivery services provided by the media service server 130. The users 110, via various user devices (not shown), obtain media content such as music from the media service server 130. The users 110 may interact with the media service server 130 by visiting a website hosted by the media service server 130. As an alternative to accessing the media service server 130 through a web browser, the users 110 may download and install a dedicated application of the media service server 130 that is designed to interact with the media service server 130. A user 110 may sign up to receive music delivery services, select or search for a seed media item, or create a media content channel.

Client devices of the users 110 are computing devices such as mobile devices (e.g., smartphones or tablets with operating systems such as ANDROID or APPLE IOS), laptop computers, desktop computers, electronic stereos in automobiles or other vehicles, or any other type of network-enabled device that play digital content. A user device includes hardware and software to output sound (e.g., speakers and microphone), connect to the network 140 (e.g., via Wi-Fi and/or 3G or other wireless telecommunication standards), and receive input from the users 110. In addition to enabling a user to obtain media content from the media service server 130, client devices may also provide the media service server 130 with data about the status and use of client devices, such as their network identifiers and geographic locations. In one particular embodiment referred to throughout the remainder of the specification, the media items are songs. It is appreciated, however, that in other embodiments, a media item alternatively and/or additionally includes other forms of audio content, such as pieces of music, audio recordings, audiobooks, etc.

The experts 120 supplement the automated analysis of the media service server 130 in analyzing media items such as songs. The experts 120 review and analyze songs provided by the media service server 130 and provide their evaluations—e.g., in the form of media features and related sub-features—back to the media service server 130. The media features include musicological features indicating recognizable aspects of the audio content of the songs (e.g., musical genre, instruments present, emotional tones) and assign each identified or unidentified musicological feature with a score indicating the presence and magnitude of the musicological feature. For example, for the features indicating the presence in a song of certain types of instruments, if guitar, piano, and violin features had scores of 5, 3, 0, respectively (e.g., on a scale from 0 to 7), that would indicate that the guitar is the primary instrument, the piano is the secondary instrument, and the violin is not present in the song. The various media features can in turn have related sub-features that further characterize sub-qualities of the media features. For example, the music instrument feature "guitar" also includes sub-features such as level of twang, distortion, wah wah, and the like. In some embodiments, the media items provided to an expert 120 are accompanied with features including scores already analyzed by the media service server 130. The experts 120 may amend the analysis of media features performed by the media service server 130.

The experts 120 may interact with the media service server 130 by visiting a website hosted by the media service server 130 or via an expert application of the media service server 130. The experts 120 use client devices to interact with the media service server 130. Similar to aforementioned client devices of the users 110, expert devices are computing devices such as mobile devices (e.g., smartphones or tablets with operating systems such as ANDROID or APPLE IOS), laptop computers, desktop computers, electronic stereos in automobiles or other vehicles, or any other type of network-enabled device that play digital content. An expert device includes hardware and software to output sound (e.g., speakers and microphone), to connect to the network 140 (e.g., via Wi-Fi and/or 3G or other wireless telecommunication standards), and to receive input from the experts 120.

The media service server 130 provides media content delivery service to users 110. The media service server 130 allows users to create and/or select media channels. A media channel is a playlist of media items that are grouped together, where the media items share one or more common media features. A media item is a form of media content and characterized by media features (e.g., musicological features such as tempo, style, or instruments present) of the media item. Users may provide a value—known as a "seed input"—for creating or selecting a media channel to request media content from the media service server 130. Examples of seed inputs include a song, an album, a musical artist, a musical genre (e.g., rock, rap, or classical), and a musical time period (e.g., Baroque, $20^{th}$ century, 80s hits, or 60s chillouts)). The media service server 130 may provide a user interface associated with a seed input where a user may select or search for a seed musical item. The media service server 130 stores a user profile for a user, which includes the user's preferences (e.g., musical preference) that is used wholly or partially to determine the seed musical item for recommending to the user.

The media service server 130 delivers media content to users 110 according to users' selections. The media service server 130 creates a media channel based on a user's 110 request for media content (e.g., a seed input), identifies media items associated with the media channel, and provides the media items identified to the user 110. As explained above, a media channel is a playlist of songs that are grouped together, where the songs share one or more common media features (e.g., musicological features). The media service server 130 may initially generate a media channel based on a seed input from the user (e.g., name of a song or band) using a list of global list of songs associated with the input. Subsequently, based on the media features identified for songs, the media service server 130 identifies songs for a music channel.

The media service server 130 identifies and associates the media features (e.g., musicological features) characterizing media items. The media service server 130 may further analyze a user's preferences in media features and correlations between one or more media features and a music channel by collecting and analyzing feedback information from a user 110. The identified correlations therefore indicate a user's preference for particular media features characterizing songs for a music channel. For example, the media service server 130 may determine from the collected feedback information that the user dislikes presentation of media items characterized by certain media features in a music channel (e.g., guitars in songs). The media service server 130 may use the identified correlations between media features and a media channel to identify songs that the user prefers in a music channel. The media service server 130 identifies musicological features of songs and provides songs to the experts 120 for further analysis. The media service server 130 enhances the musicological feature analysis of songs by the experts 120. The media service server 130 selects songs to be analyzed by the experts 120, for example, based on the identified features. The media service server 130 prioritizes songs in a ranked order and provides the songs in the ranked order to the experts 120 for analysis. In addition, the media service server 130 interacts with the experts 120 to receive musicological features or supplement the already identified musicological features.

The media service server 130 provides personalized media content delivery to users 110. The media service server 130 creates and associates a user profile for a user 110. The user profile records the user's 110 preferences for media content, and the media service server 130 uses these preferences in combination with a user's seed input, to select songs. The media service server 130 identifies a user's 110 preferences by collecting feedback information from the user 110. The feedback information may include express feedback or implicit feedback. Express feedback is feedback provided by users that directly expresses the users' preferences (e.g., like or dislike) for songs. In contrast, implicit feedback is feedback that indirectly describes a user's preferences for a song, such as the user's actions in response to the song. The media service server 130 associates collected feedback information with a song, as well as analyzing the collected feedback information and/or associating the analysis with the song. Based on the collected feedback information, the media service server 130 may generate music channels that are specific to the user 110 associated with a user profile. By collecting and associating feedback information for each song, the media service server 130 is able to effectively analyze the collected feedback information to identify a user's 110 preferences in media features (e.g., musicological features). The media service server 130 may further identify correlations between the user's 110 preferences in songs and a music channel.

The network 140 provides a communication infrastructure between the users 110, the experts 120, and the media service server 130. The network 140 is typically the Internet, but may be any network, including but not limited to a Local Area Network (LAN), a Metropolitan Area Network (MAN), a Wide Area Network (WAN), a mobile wired or wireless network, a private network, or a virtual private network.

Media Service Server

Figure 2:
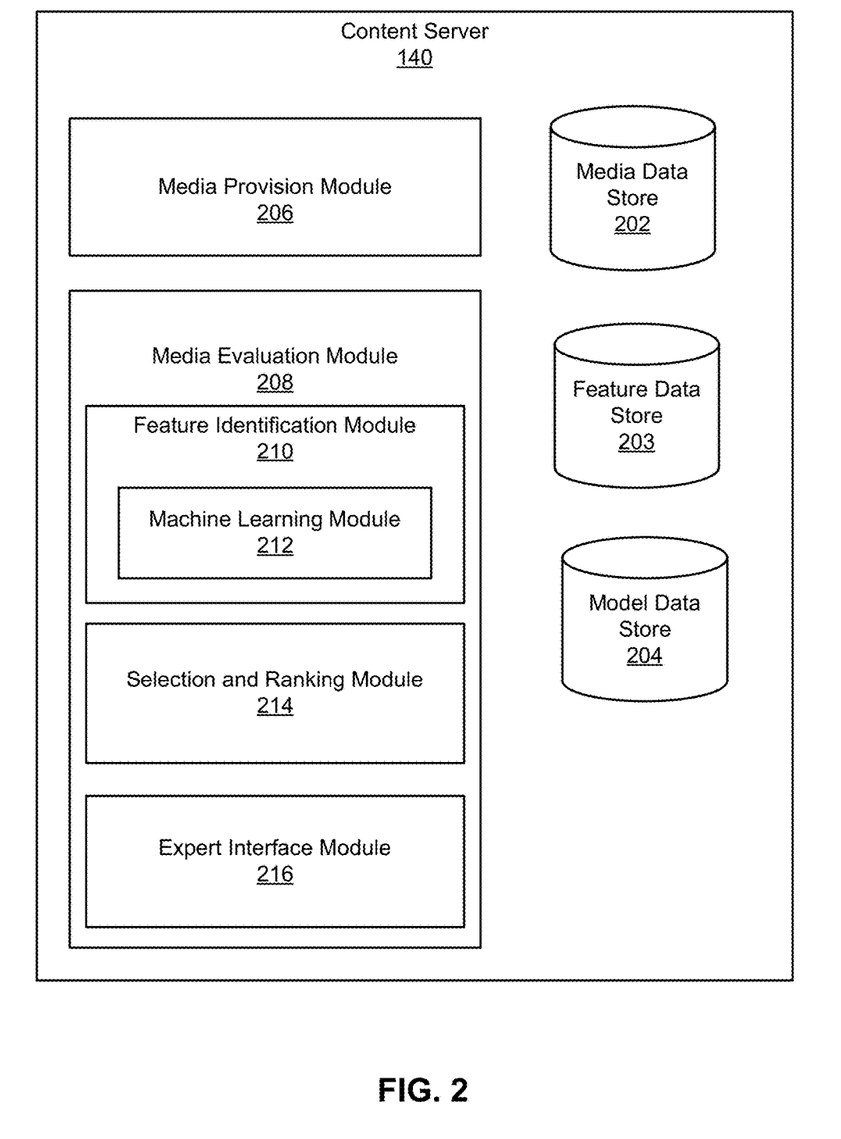
FIG. 2 is a high-level block diagram illustrating a detailed view of the media service server of FIG. 1, according to one embodiment.

The media service server 130 is now described in more detail with respect to FIG. 2. FIG. 2 is a high-level block diagram illustrating a detailed view of modules within an example media service server 130, according to one embodiment. Some embodiments of the media service server 130 have different modules than those described here. Similarly, the functions can be distributed among the modules in a different manner than is described here. The components of the media service server 130 include a media data store 202, a feature data store 203, a model data store 204, a media provision module 206, and a media evaluation module 208. The media evaluation module 208 comprises a feature identification module 210, a selection and ranking module 214, and an expert interface module 216. The feature identification module 210 comprises a machine learning module 210.

The media data store 202 stores media items and associated metadata, playlists, and mappings of media items to media features such as musicological features stored in the feature data store 203. Media content such as music content (also referred to as "music") is audio (or video having an audio component) representing sounds arranged to evoke beauty or emotion, typically through rhythm, melody, or harmony. Music metadata includes bibliographic information (e.g., artist, composer, album title, track name, track number, release date, record label, or genre) and associated media features that characterize the associated audio content. A media feature describes musicological characteristics of media items. For example, media features of a song may indicate the underlying characteristics of the song, such as the gender of the singer, the type of background vocals, the tempo, the quality of the tones (e.g., pure or distorted), whether the melody dominates the composition, or related musical influences. A given media item may have many media features, such as 100-500 media features. In one embodiment, the mapping of media items to media features is established using the MUSIC GENOME PROJECT database created by PANDORA MEDIA, INC. of Oakland, Calif.

The media feature data store 203 stores the media features. For a media item, the associated media features may be identified by the mappings of media items to media features. The model data store 204 stores machine learned models including correlations between media content (e.g., acoustic features) and media features (e.g., musicological features).

The media provision module 206 provides media content (e.g., music) to users 110. For example, the media provision module 206 selects media content and streams the selected media content to the user 110 over time. The media provision module 206 may select media content for a user 110 based at least in part on user information (e.g., user preferences in media features), user requests (e.g., a seed input), user feedback, media features, or a combination thereof. For example, media items are selected according to the identified media features characterizing the media items and the selected media items share one or more common media features.

In one embodiment, the music provision module 206 generates content playlists and selects media content for the content playlists based on a seed characteristic received from a user 110. The music provision module 206 selects media content from the media data store 202. A seed characteristic describes one or more attributes of the content playlist that the user would like to form. Seed characteristics may specify bibliographic information of audio content (e.g., track title, band name, album title, release year) or any term to describe music (e.g., musical genre, historical era, a music feature). The music provision module 206 extracts media features from the seed characteristic using a mapping between audio content associated with the seed characteristic and corresponding media features in the media feature data store 203. If the seed characteristic does not describe a single item of audio content, the music provision module 206 retrieves one or more items of audio content associated with the seed characteristic. For example, the music provision module 206 retrieves one or more representative songs (e.g., of a genre or of a band). The music provision module 206 uses the extracted music features to dynamically generate a content playlist of audio content having music features similar to the extracted music features. For example, given a seed characteristic of a band X, the music provision module 206 locates a song Y by band X and identifies media features that characterize the song Y. The music provision module 206 can then extend the content playlist to include songs with media features similar to those of song Y.

The media evaluation module 208 identifies media features and associated subfeatures for each media item stored in the media data store 202. For each media item stored in the media data store 202, the media evaluation module 208 derives corresponding media features and subfeatures and associates such mappings with the media evaluation module 208. For example, the media evaluation module 208 identifies media features such as melody (e.g., verse, chorus, improvisation, heterophony, polyphony, etc.), rhythm (e.g., pulse, beat, tempo, duration, etc.), instrumentation (e.g., piano, violin, etc.), vocals (e.g., female, male, soprano, tenor, etc.), form (e.g., AABB, AABA, ABA, passage, pieces, cycle, etc.), genre (e.g., classical, jazz, rock, etc.), keys and tonality (e.g., E sharp, C minor, etc.), and the like. In addition, the media evaluation module 208 identifies subfeatures for each feature. The media evaluation module 208 selects one or more media items from the media data store 202 to be further analyzed by the experts 120. The media evaluation module 208 prioritizes the selected media items into a ranked order and provides the media items to the experts 120 for analysis in the ranked order. The media evaluation module 208 further interfaces with the experts 120 to receive feature or supplemental feature information.

The feature identification module 210 derives media features for media items. For each identified feature of a media item, the media evaluation module 208 may also determine a numerical value quantifying a strength or applicability of that feature for the media item. In one embodiment, the numerical value is a score that indicates a likelihood of existence of a media feature. The score may be in the range of 0 and 1 with a higher score indicating that a media feature is likely to exist. The feature identification module 210 uses one or more machine learned models to derive media features for media items. A media item's audio content or acoustic features derived from the media item's audio content is provided as input to one or more machine learned models, which output media features for the media item. The machine learned models are derived by using training sets comprising media items with human-labeled media features as the ground truth, for example, by the experts 120.

The feature identification module 210 receives a media item and outputs media features of the media item. In some embodiments, the feature identification module 210 determines acoustic features of media items to determine media features. The acoustic features quantitatively describe audio content of the media items. The feature identification module 210 analyzes the raw audio content to extract acoustic characteristics of the audio content. The feature identification module 210 may apply one or more Fourier transforms, discrete cosine transforms (DCT), or other transforms to identify periodic functions (e.g., sine waves at a given frequency) in the audio content or portions thereof. For example, the spectrums resulting from a Fourier transform are acoustic features that describe the relative strength of tones or pitches within the audio content. As another example, the feature identification module 210 applies an autocorrelation function to the series of samples. The resulting coefficients may indicate tempo or meter of audio content, with the stronger autocorrelation coefficients corresponding to the stronger periods of temporal repetition. The feature identification module 210 may apply a series of transforms to determine audio features. For example, the feature identification module 210 determines the mel-frequency cepstrum coefficients (MFCCs) of the audio content by applying a DCT to an audio content item's mel-scaled log power frequency spectrum (determined from the Fourier transform). The MFCCs provide a profile of timbres within the audio content.

The feature identification module 210 may further summarize the determined acoustic features. For example, the feature identification module 210 generates acoustic feature coordinates representing the acoustic features. An acoustic feature coordinate may have entries indicating values for particular acoustic features, or the acoustic feature coordinate may be a vector or other representation of audio content's acoustic feature. In some embodiments, the feature identification module 210 applies a dimensionality reduction (e.g., PCA) by combining correlated acoustic features into one or more condensed acoustic features. As such, computational time is reduced by replacing the initial acoustic feature coordinate with a dimensionally reduced acoustic feature coordinate.

The feature identification module 210 includes a machine learning module 212 that creates one or more artificial intelligence models, classifiers, or other machine learned models stored in the model data store 203 to determine the correlation between media features and media content (e.g., audio content). In one embodiment, the machine learned models describes the correlation between media features and acoustic features of media items derived by the feature identification module 210. For example, based on the acoustic feature coordinate for audio content, the machine learning module 212 determines music features correlated with the acoustic features detected for the media content. The machine learning module 212 inputs a media item or an acoustic feature coordinate for the media item and outputs music features associated with the media item.

The machine learning module 212 creates machine learned models that may include one or more logistic classifiers, decision trees, neural networks, deep learning models, or any combination thereof. The machine learned models created by the machine learning module 212 includes model parameters that determine the mapping from the media content (e.g., the acoustic feature coordinate) to media features. For example, model parameters of a logistic classifier include the coefficients of the logistic function that correspond to different acoustic features.

As another example, the machine learned models created by the machine learning module 212 include a decision tree model, which is a directed acyclic graph where nodes correspond to conditional tests for an acoustic feature and leaves correspond to classification outcomes (i.e., presence or absence of one or more music features). The parameters of the example decision tree include (1) an adjacency matrix describing the connections between nodes and leaves of the decision tree; (2) node parameters indicating a compared acoustic feature, a comparison threshold, and a type of comparison (e.g., greater than, equal to, less than) for a node; and/or (3) leaf parameters indicating which music features correspond to which leaves of the decision tree.

The machine learning module 212 creates machine learned models (e.g., determines the model parameters) by using training data. The training data includes a set of media items labeled with media features. For example, the training data are media items for which music features have already been identified (e.g., by the feature identification module 210, by an expert 120, or a combination thereof). The machine learning module 212 determines the model parameters that predict the media features associated with the media item (e.g., based on its acoustic features). For example, the machine learning module 212 determines an objective function indicating the degree to which the determined music features matching the media features indicated in the training data. The machine learning module 212 modifies the parameters to optimize the objective function, thereby reducing differences between predicted media features and actual media features.

The machine learning module 212 may use any number of artificial intelligence or machine learning techniques to modify the model parameters, including gradient tree boosting, logistic regression, neural network training, and deep learning. The machine learning module 212 creates different types of machine learned models to determine media features and uses one or more different models to determine a media feature. For example, the machine learning module 212 compares objective functions determined over the training data for a trained decision tree and a trained logistic classifier. According to the comparison, the machine learning module 212 selects the model type that better predicts media features for the training data.

The machine learning module 212 further updates machine learned models (e.g., model parameters of the machine learned models) using information received, for example, via the expert interface module 216. The experts 120 supplements labels of media items created by the feature identification module 210 by adding new media features or modifying existing media features. The machine learning module 212 uses the received information as training data to create new machine learned models or update existing machine learned models. Experts 120 are less likely to update labels of media items created by the feature identification module 210 when the media features derived by the feature identification module 210 match the media features determined by the experts 120. As a result, positive feedback (e.g., less changes or updates) indicates that the machine learned models are accurate and negative feedback (e.g., more changes or updates) indicates that the machine learned models need to be improved. In one embodiment, the feature identification module 210 coordinates differential tests to modify the machine learned models or parameters thereof. The feature identification module 210 creates two or more different machine learned models having different model parameters. For example, one machine learned model includes existing parameters currently being used by the feature identification module 210 and another machine learned model includes parameters determined by using information collected from the experts 120. The feature identification module 210 uses the different machine learned models for different media items, compares the information collected from the experts 120, and selects to use the machine learned model which outputs media features that are supplemented less by the experts 120.

The media evaluation module 208 facilitates and directs the experts' 120 review of media items. The media evaluation module 208 may pre-process the media items prior to providing them to the experts 120 for further analysis. For example, the media evaluation module 208 identifies media features of media items, selects and ranks the media items to be analyzed, or provides an interface to facilitates the experts' 120 review based at least in part on the identified media features. As such, the experts' 120 review of the media items are more targeted. The selection and ranking module 214 selects media items for further analysis, for example, by the experts 120. The experts 120 may, for example, supplement missing information about media features, correct misidentified media features, or validate the media features identified by the feature identification module 210. The feature identification module 210 may not identify all features that are present in a media item. In addition, one or more features identified by the identification module 210 may have scores that are indeterminate (e.g., in a predetermined range such as between 0.4 and 0.6.) The feature identification module 210 may inaccurately identify media features. The selection and ranking module 214 selects media items or segments of media items that need further analysis. The selection and ranking module 214 may divide media items into segments according to the identified features. For example, the selection and ranking module 214, based on the identified melody or form, divides a media item into four segments including intro, verse, chorus, and outro and selects one or more segments for further analysis. In some embodiments, the selection and ranking module 214 selects media items or segments of media items of which the identified features have low confidence scores.

In some embodiments, the selection and ranking module 214 selects media items having media features in those areas where the accuracy of the feature identification module 210 needs to be improved. For example, media items having media features with low-confidence scores are selected. The further analysis (e.g., supplemented media feature identification) by experts 120 may be provided to the machine learning module 212 as ground truth to update or create one or more machine learned models thereby to improve the feature identification module's 210 accuracy and performance. In some embodiments, the selection and ranking module 214 selects media items or segments of media items of which the number of identified features is below a threshold (e.g., 20). In some embodiments, the selection and ranking module 214 selects media items or segments of media items of which the number of media features updated, for example, by a feature identification module 210 or by an expert 120 exceeds a threshold. In some embodiments, the selection and ranking module 214 selects all media items for further analysis. The selection and ranking module 214 determines media items or segments of media items that need further analysis and prioritizes the selected media items or segments of media items for analysis.

The selection and ranking module 214 prioritizes media items into a ranked order and provides the media items in the ranked order, for example, to the experts 120 for further analysis. In some embodiments, the selection and ranking module 214 prioritizes media items based on their popularities, with more popular media items being ranked higher. A media item's popularity increases with the number of times it is requested by the users 100 in a given time period. The more popular a media item is, the higher it is ranked by the selection and ranking module 214. In some embodiments, the selection and ranking module 214 prioritizes media items based on the popularities of the artists, with media items by more popular artists being ranked higher. An artist's popularity increases with the number of times his or her media items being requested by the users 100 in a given time period. In some embodiments, the selection and ranking module 214 prioritizes media items based on whether an artist is a new, with media items by new artists being ranked higher. In one embodiment, at least one media item of every artist needs to be analyzed, and the selection and ranking module 214 prioritizes an artist's first media item. In one embodiment, the selection and ranking module 214 organizes the selected media items into different levels (e.g., tiers) based on the determined rankings Media items of different levels may be evaluated differently. For example, media items in higher tiers may receive more extensive or prompt analysis than media items in lower tiers. As another example, media items in higher tiers may be provided to more experienced experts than media items in lower tiers. As a further example, media items in higher tiers may be provided to multiple experts for analysis whereas media items in lower tiers may be provided to only one expert for analysis.

The selection and ranking module 214 further determines one or more experts 120 for analyzing the selected media items. Experts 120 may be trained professionals for analyzing media items and may have expertise in certain fields (e.g., identifying different categories of media features, familiarity with certain genre of media items). Experts 120 may also be "crowd-sourced" people, such as amateur artists or students. The experts 120 are associated with expert accounts on the media service server 120 and identified with expert IDs. An expert 120 is notified (e.g., via emails, sms alerts, log-in alerts) when a media item is provided to him or her for evaluation. The experts 120 have different expertise and/or experience. A media item may be provided to one or more experts for further analysis according to the media item's ranking and/or the level. For example, for a media item having media features with low confidence scores, the selection and ranking module 214 identifies one or more experts with domain expertise and experience in identifying those media features. For example, for a media item that is identified by the feature identification module 210 to be an Indian raga and has low-confidence media features, one or more experts that are familiar with Indian music are identified to evaluate this media item. As another example, for higher-ranked media items, the selection and ranking module 214 identifies one or more experts with immediate availability. As one media item can be provided to multiple experts for analysis, the selection and ranking module 214 may evaluate the experts by comparing their analyses. The selection and ranking module 214 may analyze the input from the experts to score the accuracy of individual expert thereby to gain confidence in the experts. The selection and ranking module 214 may remove an expert from a list of experts when his or her media feature evaluation consistently differs from other experts.

The expert interface module 216 presents information to experts 120 for analyzing media items. The expert interface module 216 presents information related to media items such as media item metadata as well as any media features identified by the feature identification module 210. The expert interface module 216 selects and presents information to make the expert evaluation more accurate and/or efficient. In some embodiments, the expert interface module 216 presents information related to the already-identified media features. For example, the expert interface module 216 presents subfeatures of the already-identified media features. For different segments with different identified media features, the expert interface module 216 may present different user interfaces related to the identified media features via which an expert may navigate through the media segments and select the subfeatures that are present. As one example, the feature identification module 210 identifies that guitar is present in one segment of the media item and piano is present in another segment of the media item. The expert interface module 216 presents the subfeatures of the instrument "guitar" such as level of twang, distortion, wah wah, and the like when the segment including guitar is being evaluated. When the segment including piano is being evaluated, the expert interface module 216 presents the subfeatures of the instrument "piano" such as level of reverberation or sustained pedal. When the expert 120 navigates to different segments of the media item, the expert interface module 216 presents different information related to the media features identified for that segment.

As another example, the expert interface module 216 presents a media item's structure (e.g., verse, chorus, verse, bridge, or outro) identified by the feature identification module 210. The expert interface module 216 may also present the contour of a media item's melody to an expert 120. As such, an expert is allowed to traverse through different segments of a media item and to supplement or verify the media features of media items derived by the feature identification module 210. As a further example, the expert interface module 216 presents a thumbnail of the media item based on the features identified by the feature identification module 210. The thumbnail of the media item is a sample of the media item and comprises one or more segments of the media item. The expert interface module 216 presents thumbnails of media items and allows experts 120 to amend or edit the thumbnails of the media items. The expert interface module 216 allows an expert to evaluate the thumbnail created for a media item and edit the thumbnail by selecting other segments of the media item or amending the thumbnail with other segments of the media item.

Figure 3:
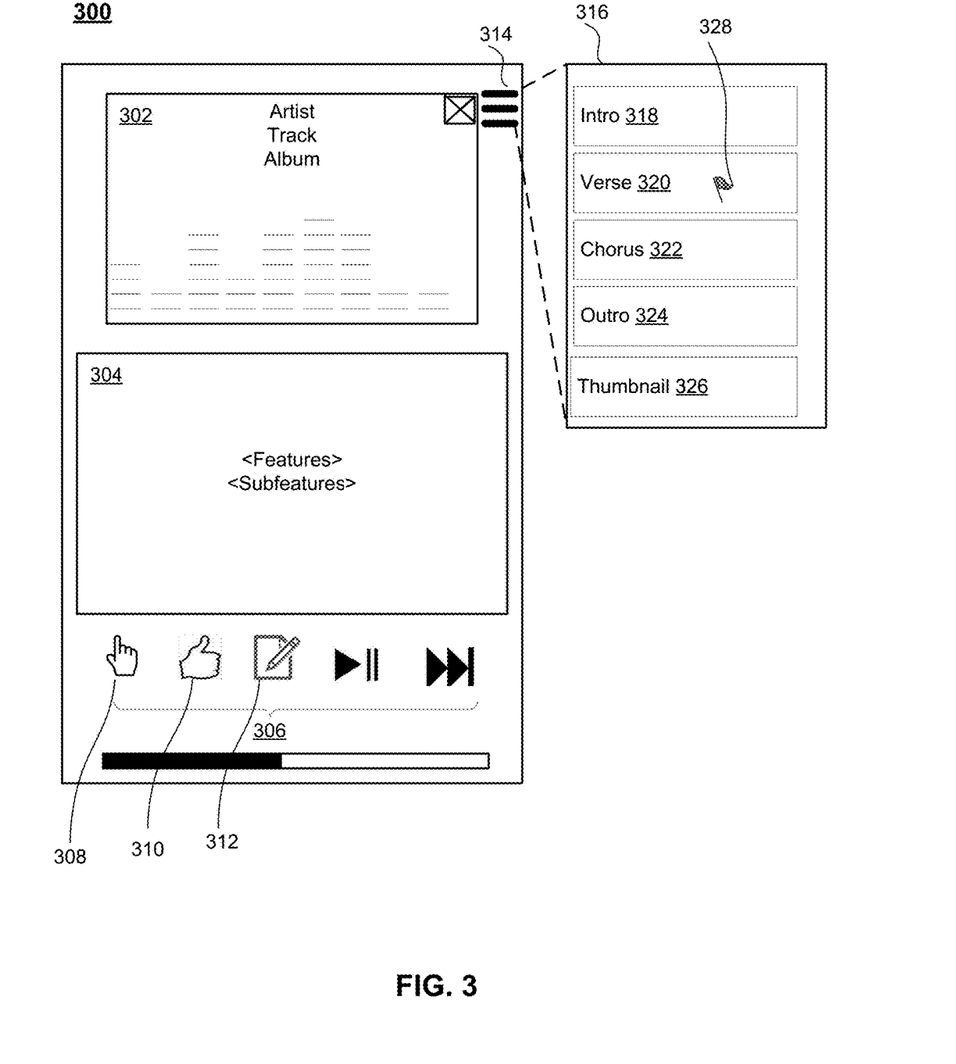
FIG. 3 illustrates an example user interface 300 for presenting media items to experts for determining media features, according to one embodiment.

FIG. 3 illustrates an example user interface 300 for presenting media items to experts for determining media features, according to one embodiment. The example user interface 300 includes an optional description area 302 providing information (e.g., metadata such as artist, track, and album), the contour of the melody), on a song currently being evaluated, a feature presentation area 304, controls 306 for selecting media features or subfeatures (via a cursor 308), confirming a selected media feature or subfeature (via thumbs up 310), editing a selected media feature or subfeature (via edit 312) and to pause/play or skip the current song.

Figure 4:
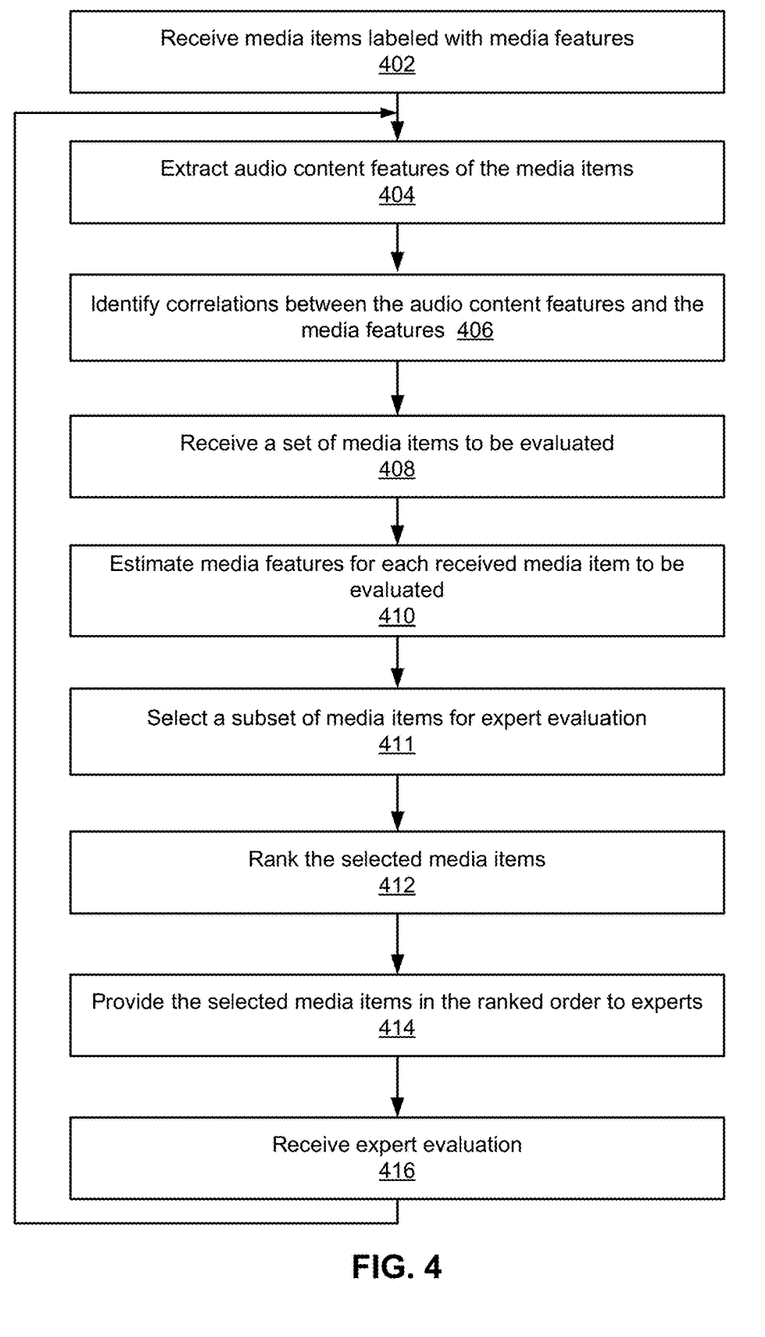
FIG. 4 is a flowchart illustrating a process of determining media features for media items according to one embodiment.

The example user interface 300 also includes a set of options 316 (shown in response to selection of popup control 314) that include an option 318 to navigate to the intro segment of the song, an option 320 to navigate to the verse segment of the song, an option 322 to navigate to the chorus segment of the song, an option 324 to navigate to the outro segment of the song, and an option 326 to review the thumbnail 326. The verse segment 320 is flagged 328 to alert an expert to pay close attention to this segment because it increase features with low-confidence scores. FIG. 4 is a flowchart illustrating a process of determining media features for media items according to one embodiment. In one embodiment, the process of FIG. 4 is performed by the media service server 130. Other entities may perform some or all of the steps of the process in other embodiments.

Likewise, embodiments may include different and/or additional steps, or perform the steps in different orders.

Media items labeled with media features are received 402, for example, from experts. The media items are characterized by the media features with scores indicating the presence and magnitude of the media features. The media features are associated with subfeatures. The audio content features (e.g., acoustic features) of the media items are extracted 404. The audio content features quantitatively describe the audio content of the media items. The media service server 130 identifies correlations between media features (or subfeatures) and audio content features. That is, the media service server 130 identifies the correlation between the presence or absence of a media feature (or a subfeature) and presence or absence of audio content features. In some embodiments, the media service server 130 includes a machine learning module and uses the received media items labeled with media features (or subfeatures) as training data to create or update one or more machine learned models. The machine learned models describe the correlation between media features and audio content features of the media items.

The media service server 130 receives 408 media items to be evaluated. In some embodiments, the received media items have no media features identified. In some embodiments, the received media items have previously-identified media features. The media service server 130 processes some or all of the received media items to be evaluated prior to providing them to experts 120 for evaluations. The media service server 130 estimates media features (or subfeatures) for each received media item to be evaluated. The media service server 130 extracts audio content features of a media item and estimates media features (or subfeatures) using the correlations between media features (or subfeatures) and audio content features identified at block 406. In some embodiments, the media service server 130 uses one or more machine learned models to estimate media features. One or more machine learned models inputs audio content features and outputs estimated media features (or subfeatures). The estimated media feature (or subfeature) is associated with a confidence score indicting the likelihood of the media feature (or subfeature) being present in the media item.

The media service server 130 selects one or more media items or segments or media items received at block 408 for evaluation by the experts 120. The media items or segments of media items to be evaluated by the experts 120 may be selected according to one or more selection criteria. As one example, the media items or segments of media items that have estimated features (or subfeatures) with low-confidence scores are selected. As another example, the media items or segments of media items of which the number of estimated features (or subfeatures) is less than a threshold number are selected. As a further example, the media items or segments of media items of which the number of media features (or subfeatures) are updated exceeds a threshold number are selected.

The media service server 130 ranks 412 the selected media items in an order and provides 414 the selected media items in the ranked order to the experts 120 for evaluation. The selected media items as well as the estimated media features for these media items are provided to the experts 120 for evaluation. The media items can be prioritized according to one or more prioritization rules. The media items can be prioritized, for example, by their popularities, by the artists' popularities, whether the artists are new, or a combination thereof. The media items can be organized into different levels (e.g., tiers) based on the determined rankings. Media items of different levels may receive different expert evaluations. The media service server 130 may determine the experts to evaluate the media items, for example, by their domain expertise and experience in evaluating the media items characterized by the estimated media features. In addition, the media service server 130 presents information related to the estimated media features (or subfeatures) to the experts for evaluation. For example, the subfeatures of an estimated media feature or estimated structures of media items may be presented. The media service server 130 may further create a thumbnail of a media item by selecting one or more segments of the media item based at least in part on the estimated media features (or subfeatures) and presents the thumbnail to an expert 120.

The media service server 130 receives 416 expert evaluation that supplement estimated media features derived at block 410. An expert 120 may identify new media features, confirm or correct estimated media features, provide a media feature with a score, or update thumbnails of media items. The media service server 130 uses the received expert evaluation (e.g., labels of media features of media items) as training data to create or update correlations between audio content features and media features.

Figure 5:
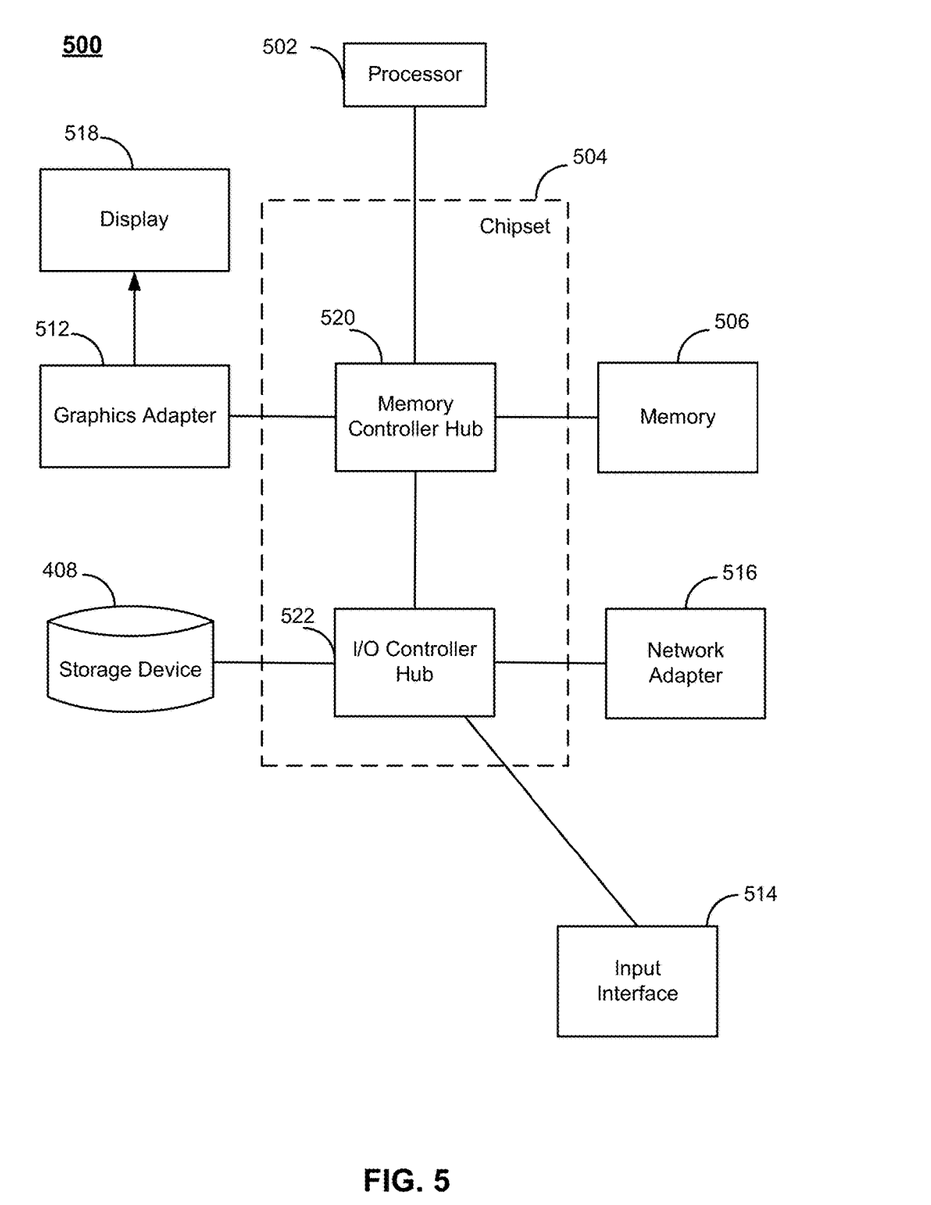
FIG. 5 is a high-level block diagram illustrating an example computer for implementing the entities shown in FIG. 1.

Turning now to a discussion of the implementation the media service server 130, FIG. 5 is a high-level block diagram illustrating an example computer 500 for implementing the entities shown in FIG. 1. The computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, an input device 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The input interface 514 is a touch-screen interface, a mouse, track ball, or other type of pointing device, a keyboard, or some combination thereof, and is used to input data into the computer 500. In some embodiments, the computer 500 may be configured to receive input (e.g., commands) from the input interface 514 via gestures from the user. The graphics adapter 512 displays images and other information on the display 518. The network adapter 516 couples the computer 500 to one or more computer networks.

The computer 500 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 508, loaded into the memory 506, and executed by the processor 502.

The types of computers 500 used by the entities of FIG. 1 can vary depending upon the embodiment and the processing power required by the entity. For example, the media service server 130 can run in a single computer 500 or multiple computers 500 communicating with each other through a network such as in a server farm. The computers 500 can lack some of the components described above, such as graphics adapters 512, and displays 518.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for selecting content based on correlations between preferred media features and specific configurations of environmental information. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method for identifying media features for streaming media items with similar media features, the method comprising:
    receiving, at a media service server, a plurality of training media items, each training media item labeled with one or more media features characterizing the training media item;
    extracting, by the media service server, audio content features from the plurality of training media items;
    identifying, by the media service server, correlations between the audio content features and the media features characterizing the plurality of training media items;
    receiving, at the media service server, a set of evaluation media items;
    for each evaluation media item:
        determining audio content features associated with the evaluation media item, and
        estimating, by the media service server, a set of media features characterizing the evaluation media item based on the audio content features associated with the evaluation media item and the identified correlations between the audio content features and the media features, each estimated media feature associated with a confidence score indicating a likelihood of the estimated media feature being present in the evaluation media item;
    selecting, by the media service server, a subset of evaluation media items having estimated media feature confidence scores indicating a low confidence of the estimated media features being present;
    providing the selected subset of evaluation media items having the estimated media features to one or more experts for expert analysis of media features characterizing the set of evaluation media items;
    receiving, from the one or more experts, labels of media features identified for evaluation media items in the subset;
    supplementing the estimated media features of the evaluation media items in the subset using the received labels;
    updating the correlations between the audio content features and the media features using the supplemented estimated media features;
    receiving, at the media service server, a request identifying a seed media item from a user device;
    selecting, by the media service server, a plurality of media items based on the seed media item, the media items associated with at least one of media features characterizing the seed media item, the media features characterizing the seed media item determined based on the identified correlations between the audio content features and the media features; and
    providing the seed media item and the plurality of media items to the user device.

2. The computer-implemented method of claim 1, wherein selecting the subset of evaluation media items further comprises:
    identifying, by the media service server, evaluation media items having estimated media features associated with the confidence scores in a predetermined low-confidence score range; and determining, by the media service server, the subset of evaluation media items responsive to the identified evaluation media items.

3. The computer-implemented method of claim 1, wherein selecting the subset of evaluation media items further comprises:
identifying, by the media service server, evaluation media items having less than a threshold number of estimated media features; and
determining, by the media service server, the subset of evaluation media items responsive to the identified evaluation media items.

4. The computer-implemented method of claim 1, wherein providing the subset of evaluation media items with the estimated media features comprises presenting subfeatures of the estimated media features.

5. The computer-implemented method of claim 1, further comprising, for each evaluation media item, selecting one or more sample segments of the evaluation media item based on the estimated features to create a thumbnail of the evaluation media item, wherein the providing the subset of evaluation media items with the estimated media features comprises presenting the thumbnail of the evaluation media item.

6. The computer-implemented method of claim 1, wherein the plurality of training media items comprises a song and the one or more media features include a musicological feature.

7. The computer-implemented method of claim 1, wherein each evaluation media item is associated with an artist, further comprising:
determining at least one of a popularity and a newness of the artist based on streamed media items associated with the artist; and
ranking, by the media service server, the subset of evaluation media items into an order according to the at least one of the popularity and the newness of the artist;
wherein the subset of evaluation media items is provided to the one or more experts in the order.

8. The computer-implemented method of claim 7, wherein ranking the subset of evaluation media items into the order comprises:
prioritizing a first evaluation media item associated with a first artist over a second evaluation media item associated with a second artist, the first artist more popular or newer than the second artist.

9. The computer-implemenied method of claim 1, wherein identifying correlations comprises using a first machine-learned model lo identify the correlations and updating the correlations further comprises:
creating a second machine-learned model identifying correlations between audio content features and media features of the evaluation media items responsive to the received labels,
using the first and second machine-learned models to estimate media features for new evaluation media items;
providing the new evaluation media items to the one or more experts;
receiving, from the one or more experts, labels of media features identified for the new media items;
selecting from among the first and second machine-learned models responsive to the received labels of media features identified for the new evaluation media items.

10. The computer-implemented method of claim 1, wherein the correlations include a first plurality of correlations and a second plurality of correlations, the first plurality of correlations between the audio content features and the first plurality of media content features characterizing the training media items and the second correlations between the audio content features and the second plurality of media content features characterizing the training media items, and wherein the labels of media features received include a first set of labels supplementing the first plurality of correlations and a second set of labels supplementing the second plurality of correlations, further comprising:
determining one of the first plurality and the second plurality of correlations receives less feedback from the experts by comparing the first set of labels to the second set of labels; and
selecting the one of the first plurality and the second plurality of correlations to determine media features characterizing media items similar to the evaluation media items.

11. A non-transitory computer-readable storage medium comprising computer program instructions executable by a processor, the computer program instructions for identifying media features for streaming media items with similar media features, comprising:
instructions for receiving a plurality of training media items, each training media item labeled with one or more media features characterizing the training media item;
instructions for extracting audio content features from the plurality of training media items;
instructions for identifying correlations between the audio content features and the media features characterizing the plurality of training media items;
instructions for receiving a set of evaluation media items;
instructions for, for each training media item:
determining audio content features associated with the evaluation media item, and
estimating, by the media service server, a set of media features characterizing the evaluation media item based on the audio content features associated with the evaluation media item and the identified correlations between the audio content features and the media features, each estimated media feature associated with a confidence score indicating a likelihood of the estimated media feature being present in the evaluation media item;
instructions for selecting, by the media service server, a subset of evaluation media items having estimated media feature confidence scores indicating a low confidence of the estimated media features being present;
instructions for providing the selected subset of evaluation media items having the estimated media features to one or more experts for expert analysis of media features characterizing the set of evaluation media items;
instructions for receiving, from the one or more experts, labels of media features identified for evaluation media items in the subset;
instructions for supplementing the estimated media features of the evaluation media items in the subset using the received labels;
instructions for updating the correlations between the audio content features and the media features using the supplemented estimated media features;
instructions for receiving, at the media service server, a request identifying a seed media item from a user device;

instructions for selecting, by the media service server, a plurality of media items based on the seed media item, the media items associated with at least one of media features characterizing the seed media item, the media features characterizing the seed media item determined based on the identified correlations between the audio content features and the media features; and instructions for providing the seed media item and the plurality of media items to the user device.

12. A system for identifying media features for streaming media items with similar media features, comprising:

a processor for executing computer program instructions; and a non-transitory computer-readable storage medium comprising computer program instructions executable by the processor, the computer program instructions comprising:

instructions for receiving a plurality of training media items, each training media item labeled with one or more media features characterizing the training media item;

instructions for extracting audio content features from the plurality of training media items;

instructions for identifying correlations between the audio content features and the media features characterizing the plurality of training media items;

instructions for receiving a set of evaluation media items;

instructions for, for each training media item:

determining audio content features associated with the evaluation media item, and estimating, by the media service server, a set of media features characterizing the evaluation media item based on the audio content features associated with the evaluation media item and the identified correlations between the audio content features and the media features, each estimated media feature associated with a confidence score indicating a strength of the estimated media feature being present in the evaluation media item;

instructions for selecting, by the media service server, a subset of evaluation media items having estimated media feature confidence scores indicating a low confidence of the estimated media features being present;

instructions for providing the selected subset of evaluation media items having the estimated media features to one or more experts for expert analysis of media features characterizing the set of evaluation media items;

instructions for receiving, from the one or more experts, labels of media features identified for evaluation media items in the subset;

instructions for supplementing the estimated media features of the evaluation media items in the subset using the received labels;

instructions for updating the correlations between the audio content features and the media features using the supplemented estimated media features;

instructions for receiving, at the media service server, a request identifying a seed media item from a user device;

instructions for selecting, by the media service server, a plurality of media items based on the seed media item, the media items associated with at least one of media features characterizing the seed media item, the media features characterizing the seed media item determined based on the identified correlations between the audio content features and the media features; and instructions for providing the seed media item and the plurality of media items to the user device.

13. The system of claim 12, wherein the computer program instructions for selecting the subset of evaluation media items further comprise instructions for:

identifying evaluation media items having estimated media features associated with the confidence scores in a predetermined low-confidence score range; and determining the subset of evaluation media items responsive to the identified evaluation media items.

14. The system of claim 12, wherein the computer program instructions for selecting the subset of evaluation media items further comprise instructions for:

identifying evaluation media items having less than a threshold number of estimated media features; and determining, by the media service server, the subset of evaluation media items responsive to the identified evaluation media items.

15. The system of claim 12, wherein the instructions for providing the subset of evaluation media items with the estimated media features comprise instructions for presenting subfeatures of the estimated media features.

16. The system of claim 12, wherein the computer program instructions further comprise instructions for, for each evaluation media item, selecting one or more sample segments of the evaluation media item based on the estimated features to create a thumbnail of the evaluation media item, wherein the instructions for providing the subset of evaluation media items with the estimated media features comprise instructions for presenting the thumbnail of the evaluation media item.

17. The system of claim 12, wherein each evaluation media item is associated with an artist, and wherein the computer program instructions further comprise instructions for:

determining at least one of a popularity and a newness of the artist based on streamed media items associated with the artist; and ranking, by the media service server, the subset of evaluation media items into an order according to the at least one of the popularity and the newness of the artist, wherein the subset of evaluation media items is provided to the one or more experts in the order.

18. The system of claim 17, wherein the computer program instructions for ranking the subset pf evaluation media items into the order comprises instructions for:

prioritizing a first evaluation media item associated with a first artist over a second evaluation media item associated with a second artist, the first artist more popular or newer than the second artist.

19. The system of claim 12, wherein the computer program instructions for identifying correlations comprises using a first machine-learned model to identify the correlations and updating the correlations further comprises instructions for:

creating a second machine-learned model identifying correlations between audio content features and media features of the evaluation media items responsive to the received labels;

using the first and second machine-learned models to estimate media features for new evaluation media items;

providing the new evaluation media items to the one or more experts;

receiving, from the one or more experts, labels of media features identified for the new media items;

selecting from among the first and second machine-learned models responsive to the received labels of media features identified for the new evaluation media items.

20. The system of claim 12, wherein the correlations include a first plurality of correlations and a second plurality of correlations, the first plurality of correlations between the audio content features and the first plurality of media content features characterizing the training media items and the second correlations between the audio content features and the second plurality of media content features characterizing the training media items, wherein the labels of media features received include a first set of labels supplementing the first plurality of correlations and a second set of labels supplementing the second plurality of correlations, and wherein the computer program instructions further comprise instructions for:
   determining one of the first plurality and the second plurality of correlations receives less feedback from the experts by comparing the first set of labels to the second set of labels; and
   selecting the one of the first plurality and the second plurality of correlations to determine media features characterizing media items similar to the evaluation media items.

\* \* \* \* \*

UNITED STATES PATENT AND TRADEMARK OFFICE
CERTIFICATE OF CORRECTION

PATENT NO. : 10,129,314 B2
APPLICATION NO. : 14/829220
DATED : November 13, 2018
INVENTOR(S) : Andreas F. Ehmann et al.

Page 1 of 1

It is certified that error appears in the above-identified patent and that said Letters Patent is hereby corrected as shown below:

On the Title Page

Column 2, Line 21, Abstract, Line 3: "the plurality of media item" to read as — the plurality of media items —

In the Claims

Column 17, Claim 9, Line 3: "using a first machine-learned model lo identify" to read as — using a first machine-learned model to identify —

Signed and Sealed this
Eleventh Day of August, 2020

Andrei Iancu
*Director of the United States Patent and Trademark Office*